United States Patent [19]
Lee

[11] Patent Number: 5,808,993
[45] Date of Patent: Sep. 15, 1998

[54] AUTOMATIC DISK DISCRIMINATING METHOD AND APPARATUS IN AN OPTICAL DISK SYSTEM

[75] Inventor: Sung-jin Lee, Suwon, Rep. of Korea

[73] Assignee: Samsung Electronics Co., Ltd., Kyungki-do, Rep. of Korea

[21] Appl. No.: 791,764

[22] Filed: Jan. 29, 1997

[30] Foreign Application Priority Data

Jan. 29, 1996 [KR] Rep. of Korea ............... 1996-1962

[51] Int. Cl.⁶ .................................................. G11B 7/00
[52] U.S. Cl. ........................................ 369/58; 369/112
[58] Field of Search ............................ 369/94, 44.25, 369/44.27, 112, 53, 58

[56] References Cited

U.S. PATENT DOCUMENTS

| | | | |
|---|---|---|---|
| 4,850,695 | 7/1989 | Mikuriya et al. | 369/53 |
| 5,003,521 | 3/1991 | Yoshida et al. | 369/44.25 |
| 5,263,011 | 11/1993 | Maeda et al. | 369/94 |
| 5,381,392 | 1/1995 | Hira | 369/58 |
| 5,446,565 | 8/1995 | Komma et al. | 369/94 |

FOREIGN PATENT DOCUMENTS 2 304 226  3/1997  United Kingdom.

OTHER PUBLICATIONS

Patents Act 1977: Combined Searcg and Examination Report under Sections 17 and 18(3).

*Primary Examiner*—Nabil Hindi
*Attorney, Agent, or Firm*—Sughrue, Mion, Zinn, Macpeak & Seas, PLLC

[57] ABSTRACT

An automatic disk discriminating method and an apparatus therefor are disclosed for use in an optical disk system. A triangular wave signal generator generates a triangular wave signal for searching for a focus point by moving a objective lens in relation to the optical disk. A window signal generator generates a window signal by comparing the triangular wave signal with a predetermined level. A disk discriminator discriminates the disk type of the optical disk by comparing the signal obtained when light from the objective lens is focused on a recording surface on the optical disk, with the window signal. Accordingly, the disk type of the optical disk is automatically discriminated during focus controlling using the distance between the disk recording surface and the objective lens of the optical pick-up.

8 Claims, 6 Drawing Sheets

AUTOMATIC DISK DISCRIMINATING METHOD AND APPARATUS IN AN OPTICAL DISK SYSTEM

BACKGROUND OF THE INVENTION

1. Field of the Invention

The present invention relates to an automatic disk discriminating method and apparatus in an optical disk system, and more particularly, to an automatic disk discriminating method and apparatus for discriminating disk types by using the difference in the distance between an objective lens of an optical pick-up and a recording surface of each disk when a light from the objective lens is focused on the recording surface of the optical disk.

2. Description of the Related Art

Generally, in an optical disk system, when data stored in a disk are read the focus spot of a laser beam radiated from an optical pickup should precisely land on a spot on the disk and travel exactly along a guard groove or data pit so that precise and distortion-free signals are read. In a system for reproducing optical disks having the same physical structure, that is, the same substrate thickness, a reproduction method can be determined by reading out data from a lead-in region of the disk without discriminating between disk types.

However, in the case of a system which can reproduce disks having different physical structures such as a compact disk (CD) and a digital video disk (DVD), it is difficult to achieve a stable servo operation and thus, the disk types cannot be discriminated. If the disk types are not discriminated, further operations cannot be performed.

FIG. 1 shows an optical disk system employing a conventional disk discriminating apparatus utilizing the amplitude of an information signal to overcome the problem. The disk types can be discriminated by two methods in the disk discriminating apparatus shown in FIG. 1.

As the first disk discriminating method, an information signal is detected by a photodiode 112b and a current-to-voltage converter 112c after a focus driver 116 and a track driver 117 perform focusing and tracking control operations corresponding to a CD. Subsequently, the amplitude of the information signal is detected by an information signal amplitude detector 113 and compared, by a comparator 114, with a predetermined value. Based on the compared result, the CPU determines the switching position of the switch 121. Specifically, if the amplitude of the information signal is less than the predetermined value, the comparator outputs a signal (DVD) which signifies that the disk is a DVD. Then, the CPU 120 controls the switching position of the switch 121 such that a DVD loop in the servo signal processor 115 is active, and generates and outputs servo control signals for the DVD. Meanwhile, if the amplitude of the information signal is larger than the predetermined value, the comparator outputs a signal (CD) which signifies that the disk is a CD. Then, the CPU 120 maintains the s switching position of the switch 121 such that a CD loop in the servo signal processor 115 is active, and generates and outputs servo control signals for the CD.

On the other hand, as the second method, information for discriminating the thickness of a substrate is extracted by performing 10 focusing and tracking control operations corresponding to a CD. If a central processing unit (CPU) 120 recognizes from the extracted information that the substrate thickness corresponds to that of a DVD, the apparatus is switched by switch 121 to a focusing control state for a DVD.

However, when these methods are used, the disk type may be erroneously determined if there is noise in the information signal which changes the amplitude of the information signal.

SUMMARY OF THE INVENTION

To solve the above-described problems, it is an object of the present invention to provide an automatic disk discriminating method which does not use an information signal recorded on a disk but uses the difference in the distance between an objective lens of an optical pick-up and a recording surface of each disk when a light from the objective lens is focused on the recording surface of the optical disk.

It is another object of the present invention to provide an apparatus suitable for implementing the above automatic disk discriminating method in an optical disk system.

To accomplish the above first object, there is provided an automatic disk discriminating method in an optical disk system which can compatibly reproduce optical disks of different thickness by focus controlling between an objective lens and a recording surface of an optical disk, said method comprising: detecting a location of the objective lens when a light from the objective lens is focused on the recording surface of the optical disk; and discriminating a disk type of the optical disk by comparing the detected location of the objective lens with a predetermined reference location.

Also to accomplish the above first object, there is provided an automatic disk discriminating method in an optical disk system which can compatibly reproduce optical disks of different thickness by focus controlling between an objective lens and a recording surface of an optical disk, said method comprising: generating a triangular wave signal for searching for a focus point by moving the objective lens in relation to the optical disk according to the triangular wave signal; generating a window signal by comparing the triangular wave signal with a predetermined level; and discriminating a disk type of the optical disk by comparing a signal obtained when light from the objective lens is focused on the recording surface of the optical disk with said window signal.

To accomplish the above second object, there is provided an automatic disk discriminating apparatus in an optical disk system which can compatibly reproduce optical disks of different thickness by focus controlling between an objective lens and a recording surface of an optical disk, the apparatus comprising: a triangular wave signal generator for generating a triangular wave signal for searching for a focus point by moving said objective lens in relation to the optical disk according to the triangular wave signal; a window signal generator for generating a window signal by comparing said triangular wave signal with a first predetermined level; and disk discriminating means for discriminating disk types by comparing a signal obtained when light from the objective lens is focused on the recording surface of the optical disk with said window signal.

Here, the disk discriminating means comprises: a comparator for determining whether the light from said objective lens is focused on the recording surface of the optical disk by using said triangular wave signal and outputting a comparison signal; an AND gate for performing an AND operation on the comparison signal and said window signal and outputting a clocking signal; a NAND gate for performing a NAND operation on a focus control state signal and a play key input signal and outputting a set signal; and a D flip-flop for receiving the set signal output by said NAND gate through a reverse set terminal, the clocking signal output by said AND gate through a clock terminal, a first logic level through a data input terminal, and a second logic level through a reverse reset terminal, and for outputting a discriminating signal indicating a disk type of the optical disk based on the set signal and the clocking signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

A preferred embodiment of an automatic disk discriminating method and apparatus according to the present invention is described below in detail with reference to the accompanying drawings.

Figure 1:
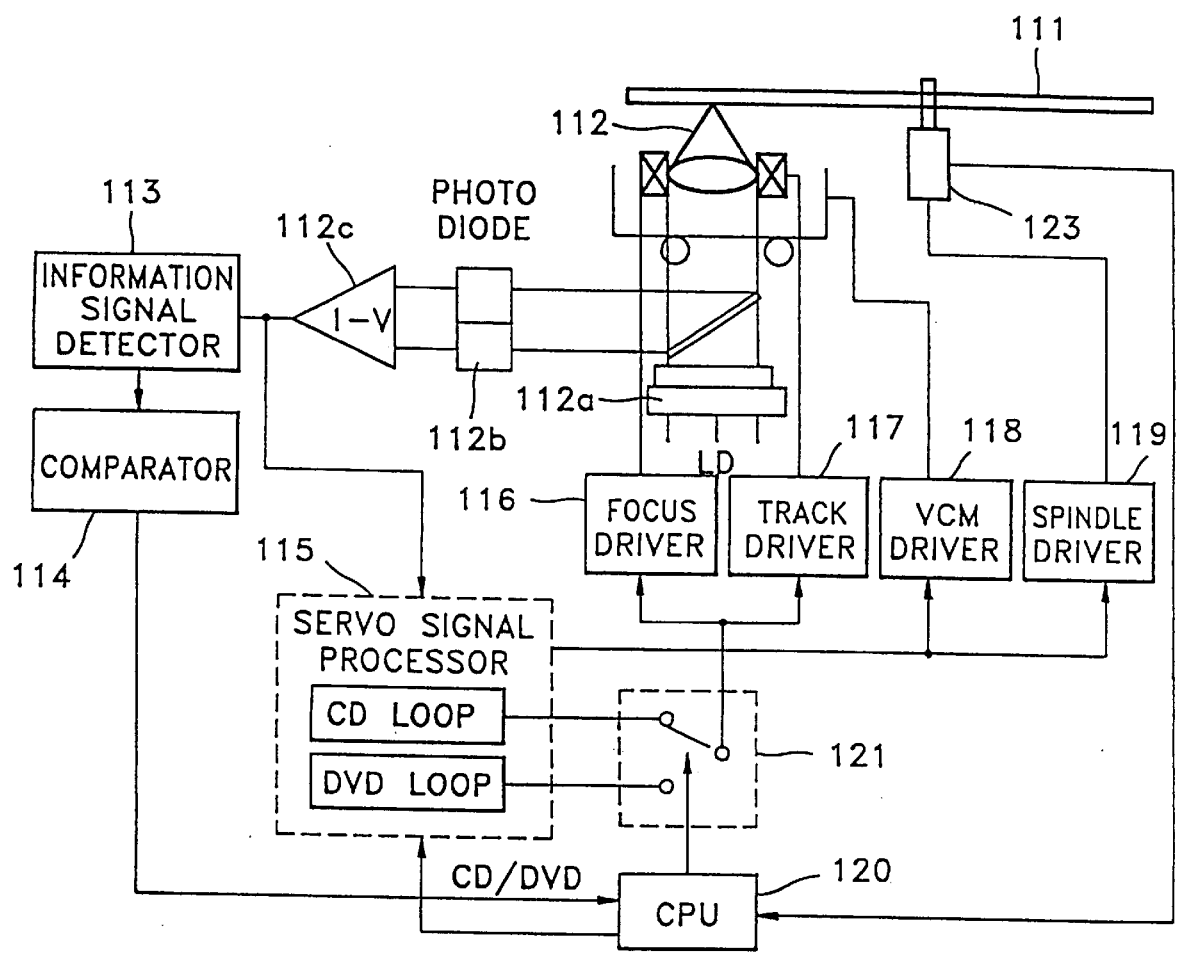
FIG. 1 is a block diagram of an optical disk system employing a conventional disk discriminating apparatus.
Figure 2:
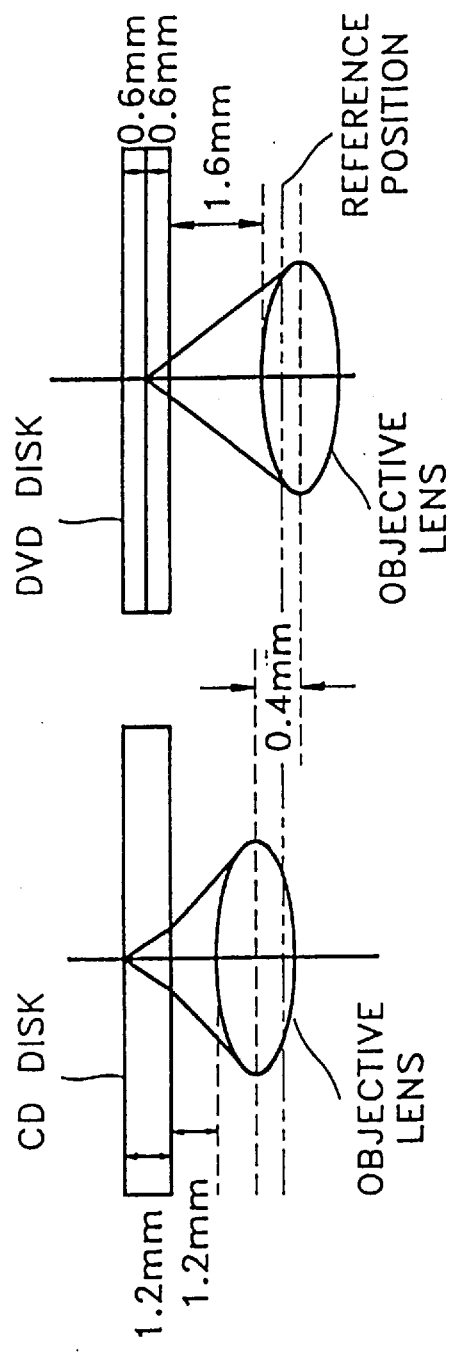
FIGS. 2A and 2B show, comparatively, the focus distance of a CD and a DVD, respectively.

FIGS. 2A and 2B shows the focus distances of a CD and a DVD.

As shown in FIG. 2A, the distance between a disk surface and the objective lens of an optical pick-up is 1.2 mm, in the case of a CD. FIG. 2B shows the distance between a disk surface and the objective lens as 1.6 mm, lo in the case of a DVD. In both FIGS. 2A and 2B the light from the objective lens is focused on the recording surface of the optical disk. The focus error signal for a CD is different from that for a DVD due to the difference in the distance between a disk surface and the objective lens when the light from the objective lens is focused on the recording surface of the optical disk. The present invention detects the focus error signal when a optical disk is being played, and discriminates a disk type based on the focus error signal.

Figure 3:
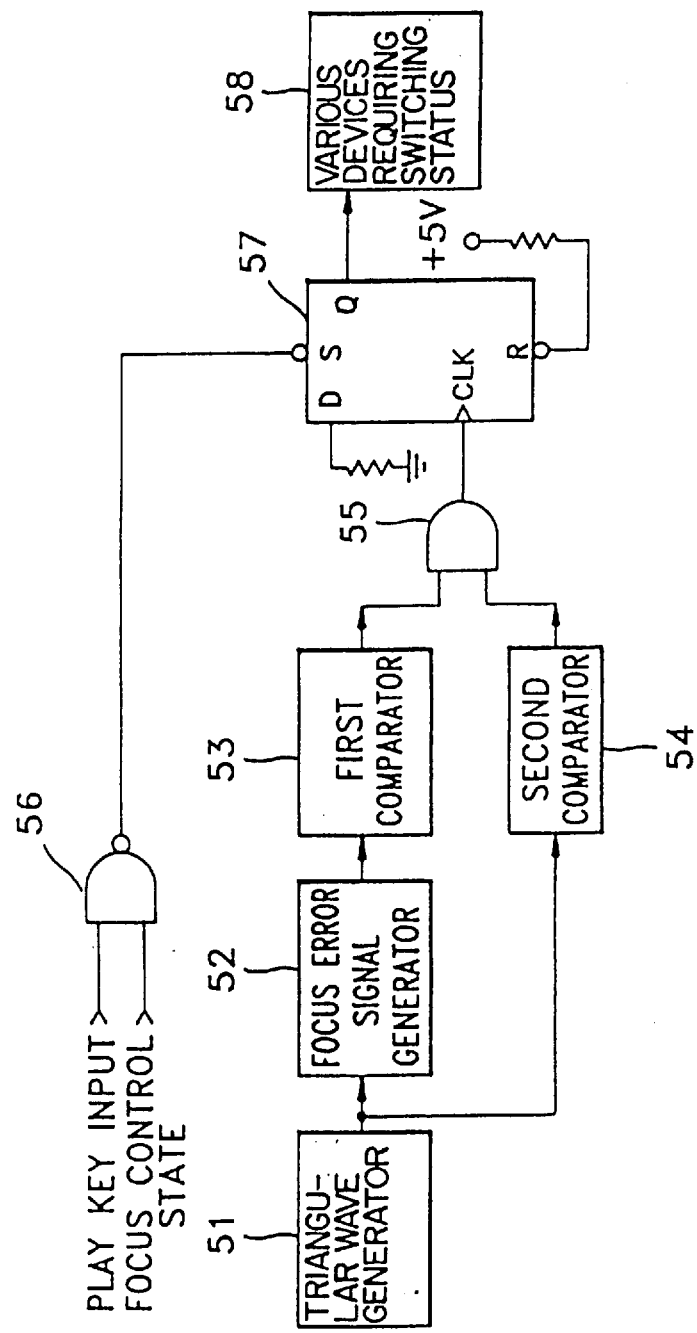
FIG. 3 is a circuit diagram of an automatic disk discriminating apparatus in an optical disk system according to the present invention.

FIG. 3 is a circuit diagram of an automatic disk discriminating apparatus according to the present invention.

The apparatus shown in FIG. 3 includes a triangular wave signal 20 generator 51, a focus error signal generator 52, a first comparator 53, a second comparator 54, an AND gate 55, a NAND gate 56, and a D flip-flop 57.

The triangular wave signal generator 51 generates a triangular wave signal to move the objective lens up and down the optical pick-up (not shown).

The focus error signal generator 52 generates a focus error signal which is generated according to the motion of the objective lens in the pick-up.

The first comparator 53 compares the focus error signal with a predetermined level "c". The first comparator 53 outputs a "HIGH" level if the focus error signal is larger than the level "c", while it outputs a "LOW" level if the focus error signal is smaller than the level "c".

The second comparator 54 compares the triangular wave signal with a predetermined level "a" to output a window signal. The window signal has a "HIGH" level when the triangular wave signal is larger than the level "a", and a "LOW" level when the triangular wave signal is smaller than the level "a".

The AND gate 55 performs an AND operation on the signal output by the first comparator 53 and the window signal output by the second comparator 54.

The NAND gate 56 performs a NAND operation on a play key input signal of the optical disk system and a focus control state signal. The play key input signal has a "HIGH" level only when the "PLAY" button of the optical disk system is pressed. Also, the focus control state signal has a "HIGH" level only when the optical disk system is in a focus controlling state.

The D flip-flop 57 receives the signal output by the NAND gate 56 via a reverse set terminal ($\overline{S}$) and the signal output by the AND gate 55 via a clock input terminal CLK. Meanwhile, a data input terminal (D) of the flip-flop 57 is grounded and the reverse reset terminal ($\overline{R}$) is set to a "HIGH" level. Thus, the flip-flop 57 discriminates the type of disk which is being played based on the signals input through the reverse set terminal ($\overline{S}$) and the clock input terminal CLK, and outputs a discrimination signal according to disk type, to various devices 58 which require a status switching signal when the disk type is changed.

Figure 4:
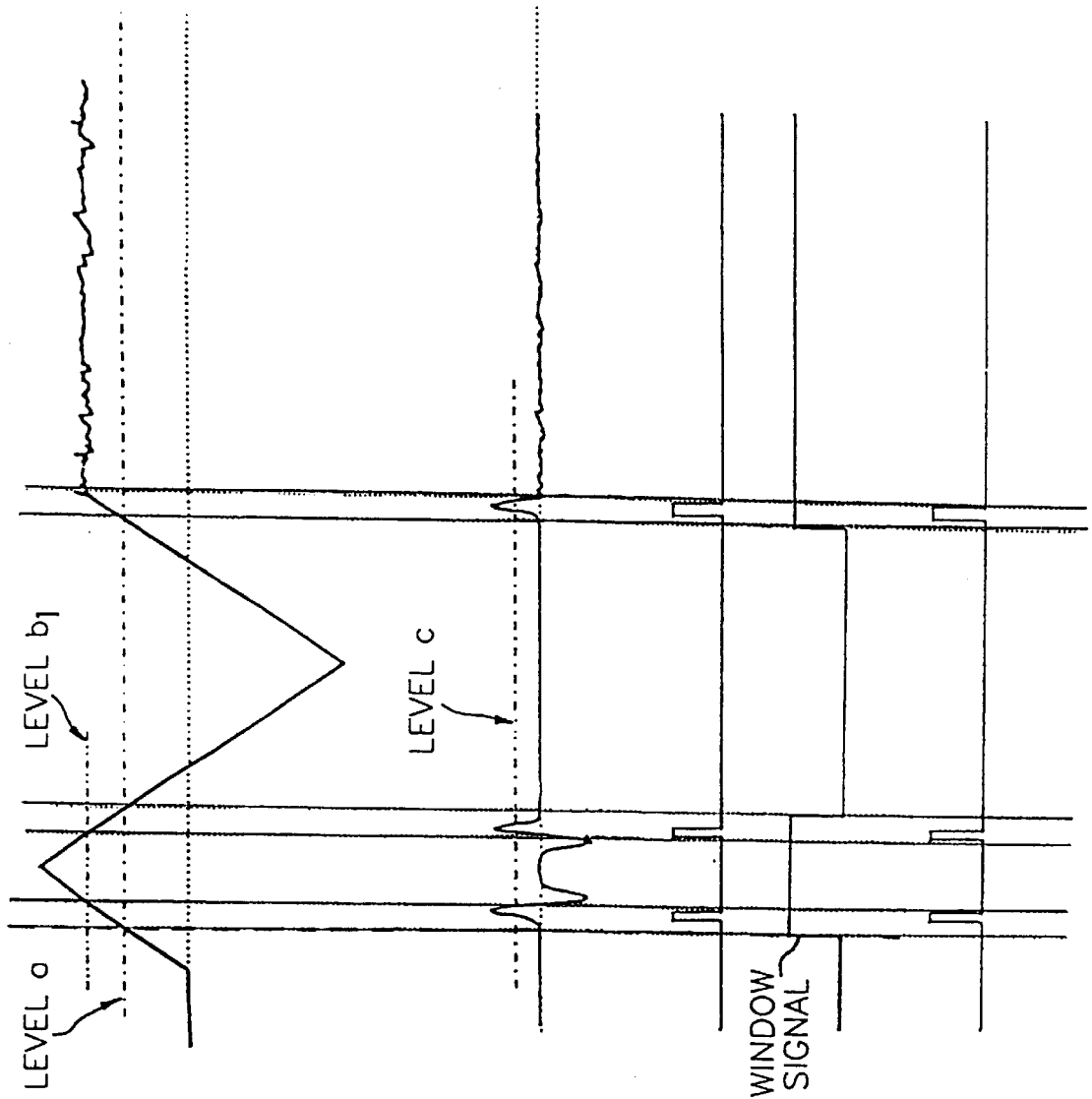
FIGS. 4A–4E are waveform diagrams showing signals relating to a CD.
Figure 5:
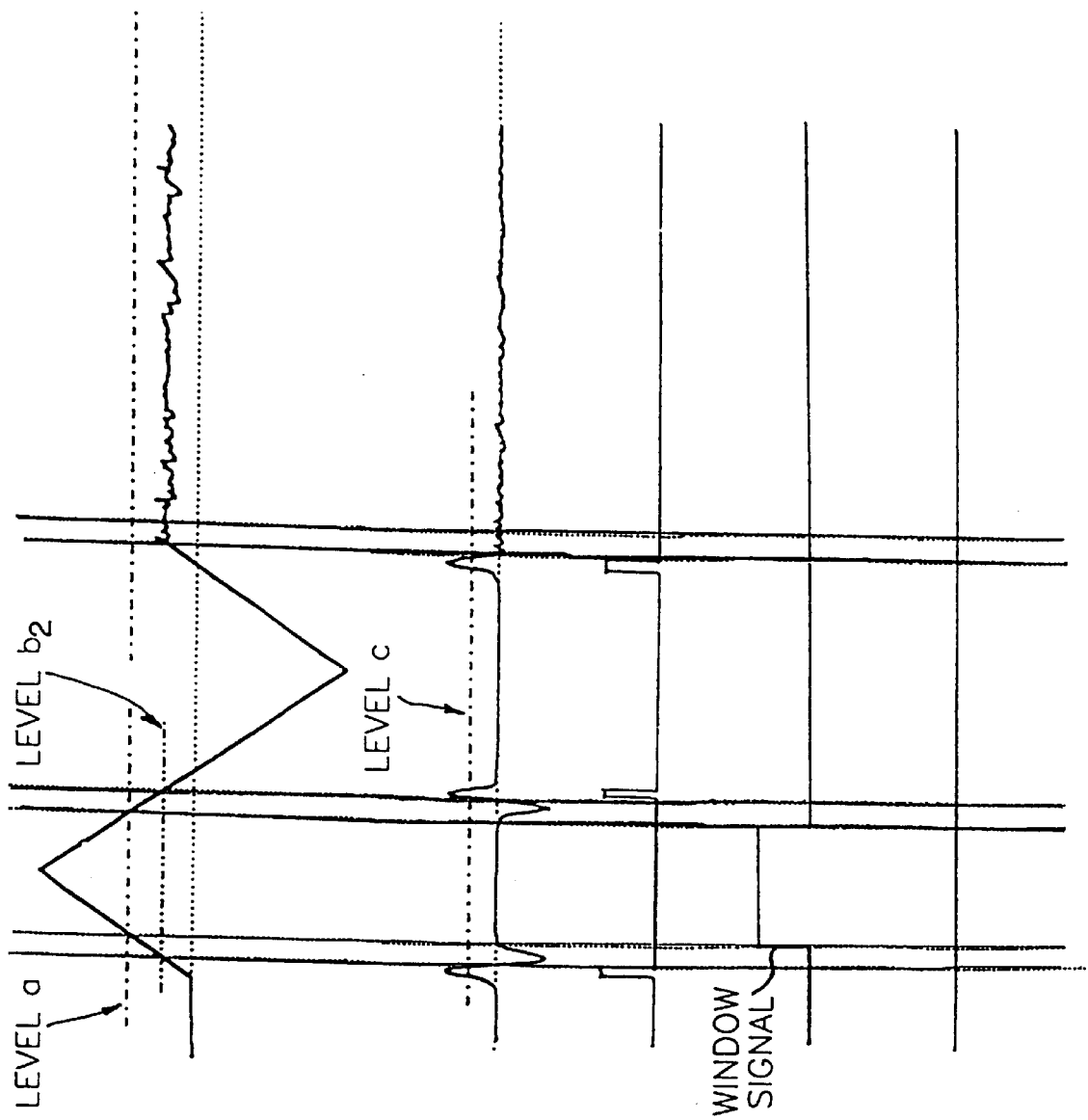
FIGS. 5A–5E are waveform diagrams showing signals relating to a DVD.

FIGS. 4A–4E show the waveforms of signals which are output by each of the components shown in FIG. 3 when the current disk is a CD, and FIGS. 5A–5E show waveforms of the related signals when the current disk is a DVD. Specifically, FIGS. 4A and 5A show triangular wave signals output by the triangular wave generator 51 for moving the objective lens up and down the pick-up. FIGS. 4B and 5B show focus error signals output by the focus error signal generator 52. FIGS. 4C and 5C show signals output by the first comparator 53. FIGS, 4D and 5D show window signals output by the second comparator 54. FIGS. 4E and 5E show signals output by the AND gate 55.

Operation of the present invention will now be described.

First, a focus actuator driving signal, having shapes shown in FIGS. 4A and 5A, is generated by the triangular wave signal generator 51 and applied to a focus actuator (not shown). Afterwards, a focus error signal is generated by the focus error signal generator 52. At this time, however, the timing at which S-shaped curves appear on the focus error signal differs depending on the type of disk being reproduced and undergoing the focus operation.

Specifically, in the case where a CD is being reproduced, the S-shaped curve as shown in FIG. 4B appears when the triangular wave signal shown in FIG. 4A has a level of level "$b_1$" which is higher than level "a". To the contrary, in the case where a DVD is being reproduced, the S-shaped curve, as shown in FIG. 5B, appears when the triangular wave signal shown in FIG. 5A has a level of level "$b_2$" which is lower than the level "a". Thus, the disk type can be discriminated between a CD and a DVD, based on the difference in timing when the S-shaped curve appears on the focus error signal.

To be more specific, the triangular wave generator 51 generates the triangular wave signal and outputs the generated signal to the focus error signal generator 52 and the second comparator 54. Here, the generated triangular wave signal has a waveform shown in FIG. 4A when the disk is a CD, and a waveform shown in FIG. 5A when the disk is a DVD.

The focus error signal generator 52 generates a focus error signal according to the motion of the objective lens due to the triangular wave signal. Here, the focus error signal has a waveform shown in FIG. 4B when the disk is a CD, and a waveform shown in FIG. 5B when the disk is a DVD.

The first comparator 53 compares the focus error signal from the focus error signal generator 52 with the predetermined level "c" and outputs the compared result. Here, the compared result has a waveform shown in FIG. 4C when the disk is a CD, and a waveform shown in FIG. SC when the disk is a DVD.

The second comparator 54 compares the triangular wave signal with the level "a" and outputs the window signal. Here, the window signal has a waveform shown in FIG. 4D when the disk is a CD, and a waveform shown in FIG. 5D when the disk is a DVD.

The AND gate 55 performs an AND operation on the signal output by the first comparator 53 and the signal output by the second comparator 54, and outputs the result to the clock terminal of the D flip-flop 57. Here, the signal output by the AND gate 55 has a waveform shown in FIG. 4E when the disk is a CD, and a waveform shown in FIG. 5E when the disk is a DVD.

That is, if the disk placed on the turn-table (not shown) is a CD, a pulse signal shown in FIG. 4E is output, while no pulse is present in the signal shown in FIG. 5E if the disk placed on the turn-table is a DVD. Thus, the disk type can be discriminated by use of the signal output by the AND gate 55.

However, since the pulse in the signal output by the AND gate 55 has a short duration, it is desirable to obtain a signal which maintains a longer long active-high duration.

For this purpose, the NAND gate 56 and the D flip-flop 57 operate as follows.

When a CD is being played and the reverse set ($\overline{S}$) terminal and the reverse reset ($\overline{R}$) terminal are set to a "HIGH" level, the D flip-flop 57 outputs a "LOW" level since the data input terminal (D) is set to the ground level and the clock signal output by the AND gate 55 is input via the clock input terminal (CLK).

On the other hand, in the case of an initial state and when no clock signal is input to the clock input terminal (CLK) via AND gate 55, a "LOW" signal is applied to the reverse set ($\overline{S}$) terminal of the D flip-flop 57, so that a "HIGH" level is output continuously to indicate that the disk is a DVD.

At this time, to prevent erroneous operation when the play key is pushed again during a reproducing operation, the NAND gate 56 performs a NAND operation on the play key input signal and the focus control state signal which indicates the focusing control status, and then outputs the result to the reverse set ($\overline{S}$) terminal of the D flip-flop 57.

Figure 6:
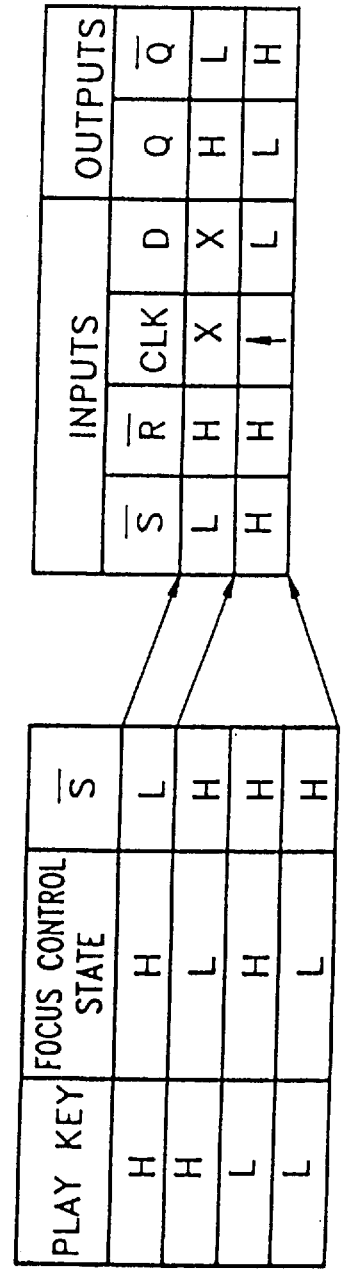
FIG. 6 is a truth table for explaining the operation of the circuit shown in FIG. 5.

A truth table showing the status of NAND gate 56 and D flip-flop 57 is shown in FIG. 6.

As described above, the automatic disk discriminating method in an optical disk system and the apparatus according to the present invention discriminate disk types automatically on the basis of the difference in the distance between the disk surface and the objective lens of the optical pick-up during focus controlling so that a separate signal representing each disk type need not be recorded on each disk any more, and the time for discriminating disk types can be reduced as well.

It should be understood that the present invention is not limited to the particular embodiments disclosed herein as the best mode contemplated for carrying out the present invention, but rather the scope of the present invention is defined in the claims appended hereto.

What is claimed is:

1. An automatic disk discriminating method in an optical disk system which can compatibly reproduce optical disks of different thickness by focus controlling between an objective lens and a recording surface of an optical disk, said method comprising the steps of:

generating a triangular wave signal for searching for a focus point by moving the objective lens in relation to the optical disk according to the triangular wave signal;

generating a window signal by comparing the triangular wave signal with a predetermined level; and discriminating a disk type of the optical disk by comparing a signal obtained when light from the objective lens is focused on the recording surface of the optical disk with said window signal.

2. The automatic disk discriminating method recited as claimed in claim 1, wherein the signal obtained when light from the objective lens is focused on the recording surface of the optical disk is a focus error signal.

3. The automatic disk discriminating method recited as claimed in claim 1, wherein said disk types discriminated are a compact disk (CD) and a digital video disk (DVD).

4. An automatic disk discriminating apparatus in an optical disk system which can compatibly reproduce optical disks of different thickness by focus controlling between an objective lens and a recording surface of an optical disk, the apparatus comprising:

a triangular wave signal generator for generating a triangular wave signal for searching for a focus point by moving said objective lens in relation to the optical disk according to the triangular wave signal;

a window signal generator for generating a window signal by comparing said triangular wave signal with a first predetermined level; and disk discriminating means for discriminating disk types by comparing a signal obtained when light from the objective lens is focused on the recording surface of the optical disk with said window signal.

5. An automatic disk discriminating apparatus in an optical disk system as claimed in claim 4 wherein said disk discriminating means outputs a signal indicating said optical disk is one of a compact disk (CD) and a digital video disk (DVD).

6. An automatic disk discriminating apparatus in an optical disk system as claimed in claim 4, said disk discriminating means comprising:

a comparator for determining whether the light from said objective lens is focused on the recording surface of the optical disk by using said triangular wave signal and outputting a comparison signal;

an AND gate for performing an AND operation on the comparison signal and said window signal and outputting a clocking signal;

a NAND gate for performing a NAND operation on a focus control state signal and a play key input signal and outputting a set signal; and a D flip-flop for receiving the set signal output by said NAND gate through a reverse set terminal, the clocking signal output by said AND gate through a clock terminal, a first logic level through a data input terminal, and a second logic level through a reverse reset terminal, and for outputting a discriminating signal indicating a disk type of the optical disk based on the set signal and the clocking signal.

7. An automatic disk discriminating apparatus in an optical disk system as claimed in claim 6, wherein said AND gate outputs a logical HIGH signal if said optical disk is a compact disk (CD) at the same time the comparison signal indicates said objective lens is focussed on the recording surface of said optical disk.

8. An automatic disk discriminating apparatus in an optical disk system as claimed in claim 6, wherein said disk discriminating means outputs a signal indicating said optical disk is one of a compact disk (CD) and a digital video disk (DVD).

* * * * *